(12) United States Patent
Zhang et al.

(10) Patent No.: US 9,017,899 B2
(45) Date of Patent: *Apr. 28, 2015

(54) FLUORINE CONTAINING IONOMER COMPOSITE WITH ION EXCHANGE FUNCTION, PREPARATION METHOD AND USE THEREOF

(75) Inventors: Yongming Zhang, Zibo (CN); Junke Tang, Zibo (CN); Ping Liu, Zibo (CN); Heng Zhang, Zibo (CN); Jun Wang, Zibo (CN)

(73) Assignee: Shandong Huaxia Shenzhou New Material Co., Ltd., Shandong (CN)

( * ) Notice: Subject to any disclaimer, the term of this patent is extended or adjusted under 35 U.S.C. 154(b) by 36 days.

This patent is subject to a terminal disclaimer.

(21) Appl. No.: 13/805,329

(22) PCT Filed: Jun. 18, 2010

(86) PCT No.: PCT/CN2010/000896
§ 371 (c)(1),
(2), (4) Date: Dec. 18, 2012

(87) PCT Pub. No.: WO2011/156938
PCT Pub. Date: Dec. 22, 2011

(65) Prior Publication Data
US 2013/0095411 A1    Apr. 18, 2013

(51) Int. Cl.
| | | |
|---|---|---|
| *H01M 8/10* | (2006.01) | |
| *B01D 69/10* | (2006.01) | |
| *B01D 69/14* | (2006.01) | |
| *C08J 5/22* | (2006.01) | |
| *D06M 14/28* | (2006.01) | |
| *B01D 71/32* | (2006.01) | |
| *C08K 9/04* | (2006.01) | |

(52) U.S. Cl.
CPC ............ *H01M 8/1041* (2013.01); *B01D 69/10* (2013.01); *B01D 69/141* (2013.01); *B01D 71/32* (2013.01); *B01D 2323/30* (2013.01); *B01D 2325/42* (2013.01); *C08J 5/2281* (2013.01); *H01M 8/1039* (2013.01); *H01M 8/106* (2013.01); *H01M 8/1072* (2013.01); *Y02E 60/521* (2013.01); *H01M 8/1023* (2013.01); *C08J 2327/18* (2013.01); *C08K 9/04* (2013.01); *D06M 14/28* (2013.01)

(58) Field of Classification Search
None
See application file for complete search history.

(56) References Cited

U.S. PATENT DOCUMENTS

| | | | |
|---|---|---|---|
| 6,254,978 B1 | 7/2001 | Bahar et al. | |
| 6,281,296 B1 * | 8/2001 | MacLachlan et al. | 525/326.3 |
| 7,311,989 B2 * | 12/2007 | Hommura | 429/494 |
| 7,411,022 B2 | 8/2008 | Guerra et al. | |
| 2002/0160271 A1 * | 10/2002 | Frech et al. | 429/314 |
| 2006/0177717 A1 | 8/2006 | Teasley et al. | |
| 2008/0003517 A1 * | 1/2008 | Komoriya et al. | 430/130 |
| 2008/0063917 A1 | 3/2008 | Yamashita et al. | |
| 2009/0292105 A1 | 11/2009 | Michot | |
| 2010/0248324 A1 * | 9/2010 | Xu et al. | 435/180 |
| 2012/0035283 A9 | 2/2012 | Xu et al. | |
| 2013/0084460 A1 | 4/2013 | Xu et al. | |
| 2013/0095411 A1 | 4/2013 | Zhang et al. | |
| 2013/0203874 A1 | 8/2013 | Xu et al. | |

FOREIGN PATENT DOCUMENTS

| | | | |
|---|---|---|---|
| CN | 101029144 A | * | 9/2007 |
| CN | 101670246 A | | 3/2010 |
| CN | 101733005 A | | 6/2010 |
| CN | 101733016 A | | 6/2010 |

OTHER PUBLICATIONS

Machine Translation of CN 101029144A (Sep. 2007).*
International Search Report completed Mar. 2, 2011 and mailed Mar. 24, 2011, corresponding to PCT/CN2010/000891, 8 pages, including English translation.
Restriction Requirement for U.S. Appl. No. 13/805,325, mailed Sep. 25, 2013, 9 pages.
Non-Final Office action for U.S. Appl. No. 13/805,325, mailed Feb. 13, 2014, 13 pages.
Notice of Allowance for U.S. Appl. No. 13/805,325, mailed Aug. 29, 2014, 14 pages.
International Search Report for PCT/CN2010/000896, dated Mar. 31, 2011, with English Translation (6 pages).
English Translation of claims for CN 101733005 A listed above (4 pages), Jun. 16, 2010.
English Translation of CN 101733016 A listed above (25 pages), Jun. 16, 2010.

* cited by examiner

*Primary Examiner* — Gregg Cantelmo
(74) *Attorney, Agent, or Firm* — Christie, Parker & Hale, LLP

(57) ABSTRACT

Provided is a composite which is comprised of one or more ion exchange resin(s) and fluorine containing polymer fiber, wherein the fiber and the film-forming resin form a triazine-ring crosslinked structure, so that the film prepared from the composite is of good airtightness and stability, as well as high ion exchange capacity and high conductivity. The preparation method of the composite, the product prepared from this composite and the use thereof are also provided.

18 Claims, No Drawings

US 9,017,899 B2

FLUORINE CONTAINING IONOMER COMPOSITE WITH ION EXCHANGE FUNCTION, PREPARATION METHOD AND USE THEREOF

CROSS-REFERENCE TO RELATED APPLICATION(S)

This application is a National Phase Patent Application and claims priority to and benefit of International Application Number PCT/CN2010/000896, filed on Jun. 18, 2010, the entire disclosure of which is incorporated herein by reference.

TECHNICAL FIELD

The present invention belongs to the field of polymer composite material and relates to a perfluorinated ion exchange composite material prepared by compositing functional group-grafting fiber and ion exchange resin.

BACKGROUND TECHNOLOGIES

Proton exchange membrane fuel cell is a power generating device which converts chemical energy to electric energy directly in an electrochemical way and is thought to be the most preferred clean and efficient power generation technology. Proton exchange membrane (PEM) is a key material of proton exchange membrane fuel cell (PEMFC).

Although, the perfluorinated sulfonic acid proton exchange membranes in use currently have good proton conductivity and chemical stability at relatively low temperature (80° C.) and high humidity, they have many deficiencies, such as weak size stability, low mechanical strength, low chemical stability and the like. Since water absorption of membrane differs under different humidity, the size swelling differs due to water absorption and the size of membrane will change as the membrane changes under different working conditions. So repeated courses finally cause mechanical damage of proton exchange membrane. In addition, cathode reaction in a fuel cell will usually release plenty of substances having strong oxidability, such as hydroxyl radical, hydrogen peroxide and the like. Such substances will attack non-fluorine group of film-forming resin molecules and result in chemical degradation, damage and foaming of the membrane. Eventually, when the working temperature of the perfluorinated sulfonic acid exchange membrane is higher than 90° C., proton conductivity of the membrane descends dramatically due to rapid dehydration of the membrane and hence the efficiency of the fuel cell declines significantly. High working temperature, however, may enhance resistance of fuel cell catalyst to carbon monoxide. Moreover, all of the existing perfluorinated sulfonic acid membranes show some permeability of hydrogen or methanol, particularly in direct-methanol fuel cell permeability of methanol is very high, which turns into a fatal problem. Therefore, the fuel cell industry is faced with major issues about how to improve strength, size stability and proton conductivity at a high temperature of perfluorinated sulfonic acid proton exchange membrane, how to decrease permeability of working medium and etc.

At present, a number of solutions have been proposed to resolve these problems. For example, the Japanese Patent No. JP-B-5-75835 uses porous medium prepared by impregnation of perfluorinated sulfonic acid resin with polytetrafluoroethylene (PTFE) to increase strength of a membrane. However, since the PTFE material is relatively soft the PTFE-containing porous medium shows no sufficient reinforcement and thereby fails to overcome the above-mentioned problem.

A Gore-Select series of composite membrane liquid developed by W. L. Gore uses a method of filling Nafion ion conductive liquid with porous Teflon (U.S. Pat. No. 5,547,551, U.S. Pat. No. 5,635,041, U.S. Pat. No. 5,599,614). Such membrane has high proton conductivity and relatively high size stability, but high creep of Teflon at high temperature, which results in performance reduction. The Japanese Patent No. JP-B-7-68377 also provides another method that uses porous medium prepared by filling proton exchange resin with polyolefin. But such porous medium does not have sufficient chemical durability and therefore has difficulties in the aspect of long-term stability. Furthermore, proton exchange capacity of the membrane is declined since proton conduction pathways are reduced due to addition of porous medium without proton conductivity.

In addition, the Japanese Patent JP-A-6-231779 provides another method for reinforcement that utilizes fluororesin fiber which is an ion exchange membrane reinforced by the reinforcement material fluorocarbon polymer ( (氟烃聚合物) ) in the original fiber form. But it is compulsory to add a relatively amount of reinforcement material in this method; under the circumstances, it tends to be more difficult to process film and electrical resistance of membrane may probably be increased as well.

The European Patent No. EP0875524B1 discloses a technology of reinforcing nafion membrane by using glassfiber membrane prepared by applying glassfiber membrane non-woven technology. Silica and other oxides are also mentioned in the patent. But non-woven glassfiber cloth is a base material that must be used in the patent, which will greatly limit range of application of its reinforcement.

U.S. Pat. No. 6,692,858 discloses a technology of reinforcing perfluorinated sulfonic acid resin by polytetrafluoroethylene fiber, comprising mixing s perfluorinated ulfonyl fluoride resin with polytetrafluoroethylene fiber, extrusion and transformation to produce fiber-reinforced perfluorinated sulfonic acid resin. This technology cannot be applied in a continuous manner due to the time-consuming transformation process.

However, the above-mentioned technologies only simply mix porous membrane or fiber with resin. Since properties of film or fiber are greatly different from or sometimes mutually exclusive to those of film-forming resin, a gap between film-forming molecule and reinforcement article is easily generated and sometimes some pores of reinforced microporous membrane are not filled by resin. Thus, such membranes usually show high gas permeability. When a fuel cell is working, high permeability usually results in energy loss and cell damage caused by overheating.

SUMMARY OF THE INVENTION

One objective of the present invention is to provide a composite material which is prepared by compositing ion exchange resin and fluorine-containing polymer fiber, wherein nitrile group in ion exchange resin forms three triazine ring cross-linked structure with that grafted in fluorine-containing polymer fiber to endow said composite material with high mechanical properties and air tightness as well as high ion exchange capacity and conductivity. Another objective of the present invention is to provide a preparation method of said composite material. Another objective of the present invention is to provide an ion exchange membrane prepared from the above-mentioned composite material. Another objective of the present invention is to provide a fuel cell comprising the above-mentioned ion exchange membrane. Another objective of the present invention is to provide a use of the above-mentioned composite material.

The above-mentioned objectives of the present invention can be achieved by using the following technical schemes:

In one aspect, the present invention provides a composite material which is composed of one or more ion exchange resins with ion exchange function and fluorine-containing polymer fiber functioning as reinforcing material, wherein surface of the fluorine-containing polymer fiber is modified by fluorine-containing functional monomers through grafting; in the ion exchange membrane for forming the composite material, at least one ion exchange resin comprises nitrile group which forms triazine ring cross-linked structure with the nitrile group of the grafted functional monomer in fluorine-containing polymer fiber.

Preferably, said functional monomer comprising nitrile group is one or more combinations of substances shown in the following general formula (I):

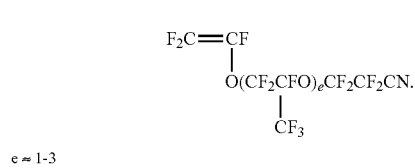

(I)

$e \approx 1\text{-}3$

The ion exchange resin containing nitrile group is one or more combinations of resins shown in the following general formulas (II) and/or (III):

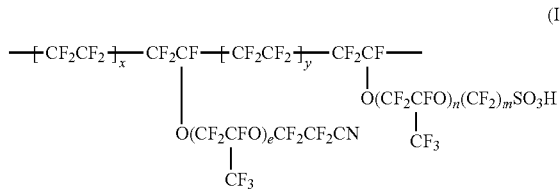

(II)

wherein $e \approx 1\text{-}3$; $n = 0$ or $1$; $m = 2\text{-}5$; $x, y =$ an integer of 3-15;

wherein a, b, c=an integer of 3-15; a', b', c'=an integer of 1-3; j=0-3.

More preferably, said composite material also contains one or more combinations of resins shown in the following general formulas (IV) and/or (V) and/or (VI):

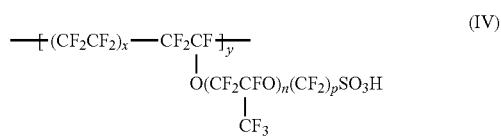

(IV)

wherein $x = 3\text{-}15$, $n = 0\text{-}2$; $p = 2\text{-}5$;

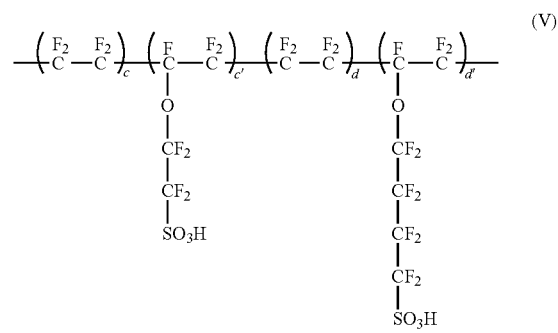

(V)

wherein c, d=an integer of 3-15; c', d'=an integer of 1-3.

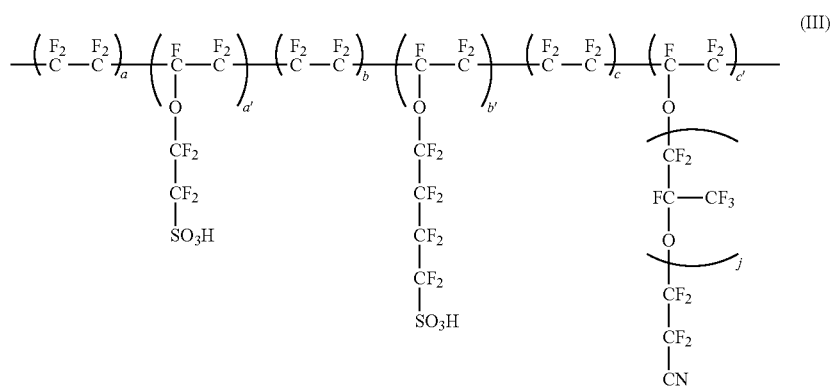

(III)

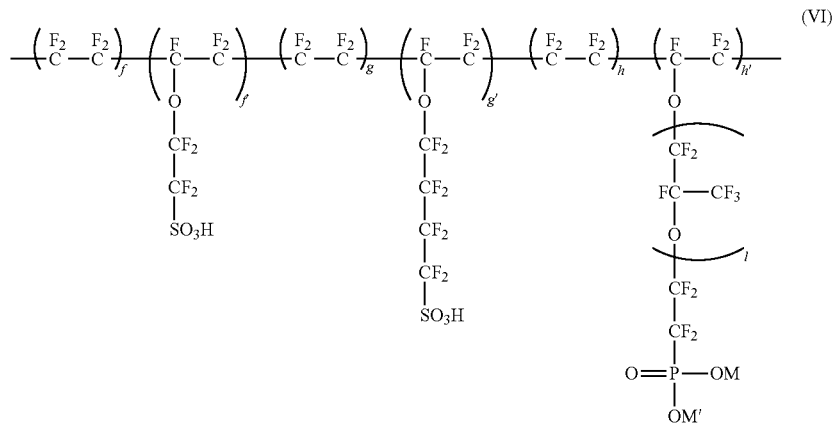

wherein f, g, h=an integer of 3-15; f', g', h'=an integer of 1-3; i=0-3; M, M'=H, K, Na or $NH_4$.

The ion exchange capacity of the resins as shown in said general formulas II, III, IV, V and VI is 0.80-1.60 mmol/g; the number average molecular weight is 150,000-450,000.

Preferably, said fluorine-containing polymer fiber is one or more selected from polytetrafluoroethylene fiber, polyperfluorinated ethylene propylene fiber, perfluoropropyl vinylether fiber and/or fluorocarbon polymer fiber; the diameter of the fiber is 0.005 μm-50 μm and the length is 0.05-3 μm; the preferred diameter is 0.01-20 μm; mass ratio of fluorine-containing polymer fiber to ion exchange resin is 0.5-50:100, preferably 0.5-20:100.

Preferably, the above-mentioned composite material may further comprise high valence metal compound, through which part of acid exchange groups in ion exchange resin form physical bonds in between. Meanwhile, part of high valence metal compounds which are also catalysts of forming triazine ring cross-linked structure form complexing bond with the trizaine ring; preferably, said high valence metal compound forming physical bonds is one or more combinations selected from compounds of the following elements: W, Zr, Ir, Y, Mn, Ru, Ce, V, Zn, Ti and La; more preferably, high valence metal ion compound is one selected from nitrate, sulfate, carbonate, phosphate, acetate or double salts thereof; or one or more selected from cyclodextrin, crown ether, acetylacetone, nitrogen-containing crown ether or nitrogen-containing heterocycle, EDTA, DMF or DMSO complex of such metal elements in their highest or intermediate valence state; or selected from hydroxide of such metal elements in their highest or intermediate valence state; or selected from oxide, with perovskite structure, of such metal elements in their highest or intermediate valence state, comprising but not limited to compounds, $Ce_xTi_{(1-x)}O_2$ (x=0.25-0.4), $Ca0.6_{La0.27}TiO_3$, $La_{(1-y)}Ce_yMnO_3$ (y=0.1-0.4) and $La_{0.7}Ce_{0.15}Ca_{0.15}MnO_3$. The added amount of the high valence metal compound is 0.0001-5 wt % of weight of resin, preferably 0.001-1 wt %.

In another aspect, the present invention provide a preparation method of the above-mentioned composite material, comprising adding trace strong protonic acid and/or Lewis acid into the composite material as catalyst to allow the nitrile group of at least one nitrile group-containing ion exchange resin to form triazine ring cross-linked structure with the nitrile group of functional monomer grafted in fluorine-containing polymer fiber; preferably, said protonic acid is selected from $H_2SO_4$, $CF_3SO_3H$, or $H_3PO_4$; said Lewis acid is selected from $ZnCl_2$, $FeCl_3$, $AlCl_3$, organotin, organic antimony, or organic tellurium. Methods of forming triazine ring cross-linked structure can be referred to U.S. Pat. No. 3,933, 767 and EP1464671A1. The amount of Lewis acid and protonic acid to be added is usually 0.1%-1% of resin weight.

Preferably, the preparation method of the composite material containing high valence metal compounds comprises the following steps:

(1) Mixing the solution of high valence metal compound, acid crosslinking catalyst, dispersed solution of ion exchange resin and nitrile group-grafted fiber, followed by forming wet membrane on a plate after pouring, tape casting, screen-printing process, spraying or impregnating process;

(2) Subjecting the wet membrane to heat treatment at 30-300° C. to obtain composite material with triazine ring cross-linked structure;

Solvent used in the processes of solution pouring, tape casting, screen-printing, spraying impregnating and the like is one or more selected from dimethylformamide, dimethylacetamide, methylformamide, dimethyl sulfoxide, N-methylpyrrolidone, hexamethyl phosphoric acid amide, acetone, water, ethanol, methanol, propanol, isopropanol, glycol and/or glycerol; preparation conditions include: the concentration of resin dispersed solution is 1-80%, the temperature for heat treatment is 30-300° C., the time for heat treatment is 1-600 minutes; preferred preparation conditions include: the concentration of resin dispersed solution is 5-40%, the temperature for heat treatment is 120-250° C., the time for heat treatment is 5-200 minutes; wherein the amount of the high valence metal compound to be added is 0.0001-5 wt % of weight of resin, preferably 0.001-1 wt %; the preferred acid crosslinking catalyst is Lewis acid and/or protonic acid and the amount to be added is 0.1-1 wt % of weight of resin.

In another aspect, the present invention provides an ion exchange membrane made from the above-mentioned composite material.

In a further aspect, the present invention provides uses of the above-mentioned composite material in preparation of ion exchange membrane of fuel cells.

The present invention has the following advantages in comparison with the prior arts:

At least one of ion exchange resins forming the composite material of the present invention comprises nitrile group which may form triazine ring cross-linked structure with the nitrile group grafted in fluorine-containing polymer fiber. As a result of the formed triazine ring cross-linked structure, the above-mentioned composite material turns into a close integral structure. In a preferred embodiment, the high valence metal forms physical-bonding cross-linking structure with acid groups in ion exchange resins, while the triazine ring forms complexing bond with the high valence metal too. Accordingly, the ion exchange membrane made from the composite material of the present invention possesses not only high ion exchange capacity but also good mechanical strength, air tightness and stability. Comparing with the ion exchange membrane made from ordinary composite materials, the ion exchange membrane made from the composite material of the present invention have advantages over the ordinary ion exchange membrane in conductivity, tensile strength, hydrogen penetration current, dimensional change rate and the like.

The present invention will be illustrated in details hereinafter.

The perfluorinated sulfonic acid ion membrane to be used in fuel cells should fulfill the following requirements: good stability, high conductivity and high mechanical strength. In general, when ion exchange capacity increases, equivalent value of a perfluorinated polymer is declined (when the equivalent value (EW value) decreases, ion exchange capacity IEC=1,000/EW) and strength of the membrane is reduced in the meanwhile. Gas permeability of the membrane is then increased as well, which will have vital impact on fuel cells. Thus, it is key for preparing membrane with high ion exchange capacity as well as good mechanical strength, air tightness and stability to apply fuel cells, especially used in automobiles and other vehicles.

To overcome the deficiencies of the prior arts, the present invention provide a composite material and preparation method thereof. The composite material provided in the present invention utilizes fiber as reinforcing material, where the binding mode and method of padding fibers merely with ion exchange resin used in the past are changed and instead a triazine ring cross-linked structure is generated between fiber and ion exchange resin. The membrane obtained therefore possesses very high mechanical strength and air tightness.

A composite ion material, wherein:

(a) Said composite material is composed of one or more ion exchange resins with ion exchange function and fluorine-containing polymer fiber functioning as reinforcing material;

(b) Surface of said fluorine-containing polymer fiber is modified by fluorine-containing functional monomers through grafting;

(c) At least one of ion exchange resins forming the composite material comprises nitrile group which forms triazine ring chemical cross-linked netlike structure (as shown by X) with the functional monomer grafted in fluorine-containing polymer fiber.

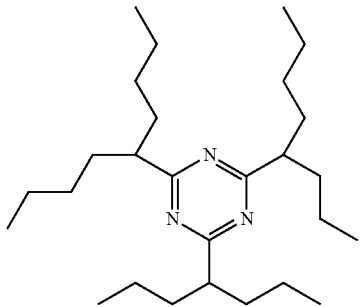

The fiber as reinforcing material is one or more selected from polytetrafluoroethylene fiber, polyperfluorinated ethylene propylene fiber, perfluoropropyl vinylether fiber and/or fluorocarbon polymer fiber; the diameter of the fiber is 0.005 μm-50 μm and the length is 0.05 μm-3 mm; the preferred diameter is 0.01-20 μm; mass ratio of fiber to perfluorinated ion exchange resin is 0.01-50:100.

The nitrile group-containing functional monomer to be grafted to the fiber is one or more substances as illustrated in general formula (I):

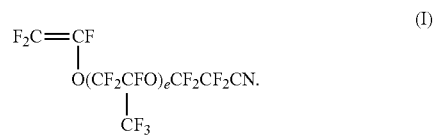

$e \approx 1-3$

Methods for grafting include one or more selected from the followings: fibers are reacted with grafting monomers by means of heat, light, electron radiation, plasma, X-ray, radical initiator and the like. The concrete preparation methods have been disclosed by many publications, for example, the method of grafting modification polyvinylidene fluoride (PVDF) nanofiber with plasma was disclosed in Page 33, Iss. 5, Vol. 27, Journal of Tianjin Polytechnic University (2008).

In the composite material provided in the present invention, the ion exchange resin comprising nitrile group may be one or more combinations of polymers comprising repeating structures shown in the following general formulas (II) and/or (III):

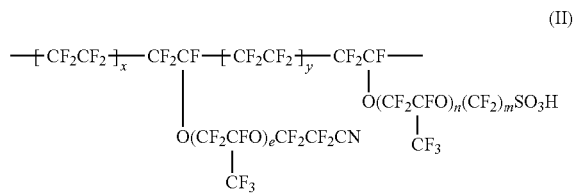

wherein $e \approx 1-3$; $n=0$ or $1$; $m=2-5$; $x$, $y=$an integer of 3-15;

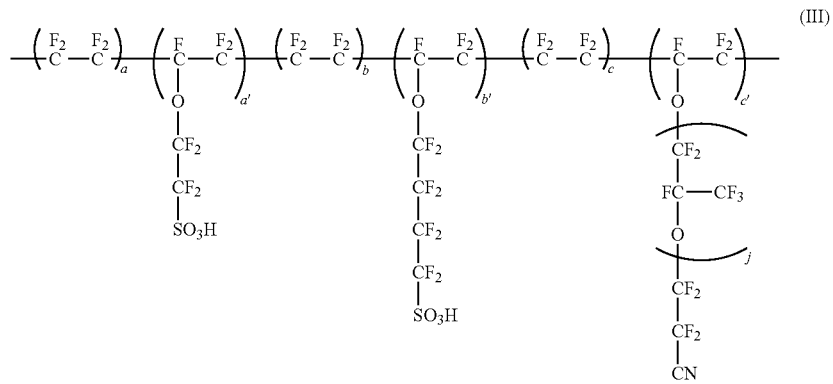

(III)

wherein a, b, c=an integer of 3-15; a', b', c'=an integer of 1-3; j=0-3.

The ion exchange resin used in the present invention may be one or more combinations of polymers comprising repeating structures shown in the following general formulas (IV) and/or (V) and/or (VI):

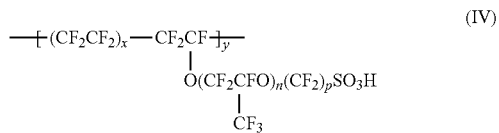

(IV)

wherein x=3-15, n=0-2; p=2-5;

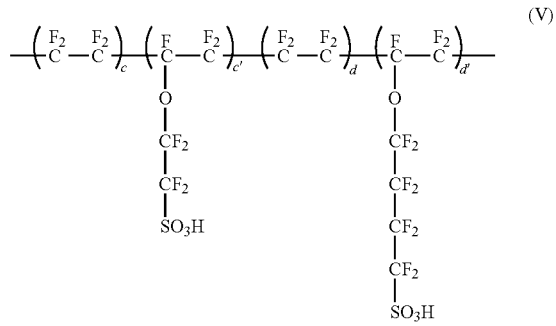

(V)

wherein c, d=an integer of 3-15; c', d'=an integer of 1-3;

wherein f, g, h=an integer of 3-15; f', g', h'=an integer of 1-3; i=0-3; M, M'=H, K, Na or $NH_4$.

The ion exchange capacity of said resin is 0.80-1.60 mmol/g; the number average molecular weight is 150,000-450,000.

The perfluorinated sulfonic acid resins as shown in formulas IV, V or VI must be mixed with those as shown in formulas II or III for use.

The method of generating triazine ring cross-linked structure between the nitrile group of ion exchange resin and that of fiber comprises adding trace strong protonic acid or Lewis acid into the composite material as catalyst when preparing membrane; wherein the protonic acid is selected from $H_2SO_4$, $CF_3SO_3H$, or $H_3PO_4$; the Lewis acid is selected from $ZnCl_2$, $FeCl_3$, $AlCl_3$, organotin, organic antimony, or organic tellurium. Methods of forming triazine ring cross-linked structure can be referred to U.S. Pat. No. 3,933,767 and EP1464671A1. The amount of Lewis acid and protonic acid to be added is usually 0.1%-1% of resin weight.

The composite material provided in the present invention may further comprise high valence metal compound, through which part of acid exchange groups in ion exchange resin form physical bonds in between. Meanwhile, part of high valence metal compounds which are also catalysts of forming triazine ring cross-linked structure may form complexing bond with the trizaine ring.

Said high valence metal compound forming physical bonds is one or more combinations selected from compounds of the following elements: W, Zr, Ir, Y, Mn, Ru, Ce, V, Zn, Ti and La.

Said metal ion compound with high valence is one selected from nitrate, sulfate, carbonate, phosphate, acetate or double salts thereof of such metal elements in their highest or inter-

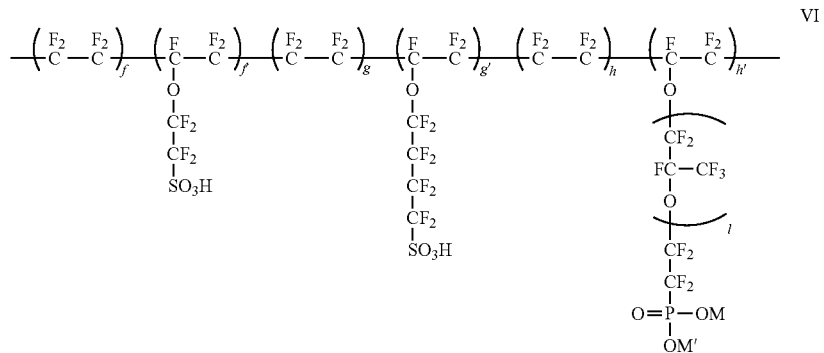

VI mediate valence state. Said metal ion compound with high valence is selected from cyclodextrin, crown ether, acetylacetone, nitrogen-containing crown ether or nitrogen-containing heterocycle, EDTA, DMF or DMSO complex of such metal elements in their highest or intermediate valence state. Said metal ion compound with high valence is selected from hydroxide of such metal elements in their highest or intermediate valence state. Said metal ion compound with high valence is selected from oxide, with perovskite structure, of such metal elements in their highest or intermediate valence state, comprising but not limited to the following compounds: $Ce_xTi_{(1-x)}O_2$ (x=0.25-0.4), $Ca0.6_{La0.27}TiO_3$, $La_{(1-y)}Ce_yMnO_3$ (y=0.1-0.4) and $La_{0.7}Ce_{0.15}Ca_{0.15}MnO_3$. The amount of the high valence metal compound to be added is 0.0001-5 wt %, preferably 0.001-1 wt %.

The preparation method of the composite material containing high valence metal compounds comprises the following steps:

(1) Preparing dispersed solution of ion exchange resin, mixing the solution of high valence metal compound and acid crosslinking catalyst with the above-mentioned dispersed solution of resin and nitrile group-grafted fibers, followed by generating wet membrane on a plate after pouring, tape casting, screen-printing process, spraying or impregnating process;

(2) Treating the wet membrane at 30-250° C.;

(3) After treatment, obtaining the composite material comprising film-forming resin cross-linked with fiber.

Solvent used in the processes of solution pouring, tape casting, screen-printing, spraying impregnating and the like is one or more selected from dimethylformamide, dimethylacetamide, methylformamide, dimethyl sulfoxide, N-methylpyrrolidone, hexamethyl phosphoric acid amide, acetone, water, ethanol, methanol, propanol, isopropanol, glycol and/or glycerol; the concentration of resin dispersed solution is 1-80%, preferably 5-40%; the temperature for heat treatment is 30-300° C., preferably 120-250° C.; the time for heat treatment is 1-600 minutes, preferably 5-200 minutes.

In another aspect, the present invention provides an ion exchange membrane made from the above-mentioned composite material.

In another aspect, the present invention provides a fuel cell comprising the above-mentioned ion exchange membrane.

In a further aspect, the present invention provides uses of the above-mentioned composite material in preparation of ion exchange membrane of fuel cells.

The beneficial effects of the present invention include:

The present invention provides an ion exchange composite material which is obtained by bonding a graft modified fiber with an ion exchange resin via triazine ring and has good chemically stability, mechanical properties and air tightness. Since the used fiber forms triazine ring cross-linked structure with film-forming resin, in a preferred embodiment, part of acid groups of film-forming resin may further form physical bonds in between through high valence metal while the triazine ring also forms complexing bond with high valence metal and thus the disclosed composite material is a close integral structure but not as the prior art where ion exchange resin is merely simply mixed with fiber. The ion membrane provided in the present invention overcomes the deficiencies of past fiber composite membrane, such as poor air tightness, the shortcoming that ion exchange resin is easy to be separated from the fiber, and the like.

BEST MODES OF THE INVENTION

The present invention will be further illustrated in combination with embodiments, which are not used to limit the present invention.

Example 1

The polyperfluorinated ethylene propylene fiber, 30 μm in diameter and 3 mm in length (e.g. Teflon FEP fiber from DuPont) was charged into a plasma generator to produce plasma by utilizing Ar as working gas under 1 Pa. The obtained plasma was grafted with the following monomer

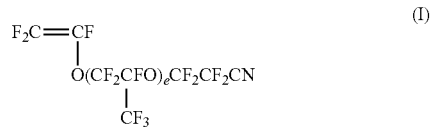

wherein e=1, and then mixed in an ethanol-water solution (mass ratio of ethanol to water is 1:1) containing 25% perfluorinated sulfonic acid resin with trace triphenyltin (mass ratio of the fiber to the resin is 1:100) and 1% cerium(III) nitrate, wherein the structure formula of perfluorinated sulfonic acid resin is

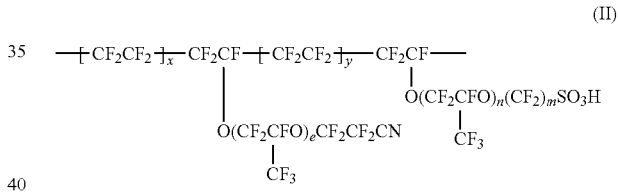

wherein e=1; n=1; m=2; x=13; y=11, number average molecular weight: 160,000 (synthesis of the resin can be found in CN200910230762.x).

The obtained solution was formed to membrane by tape casting. The wet membrane was treated at 190° C. for 20 minutes to obtain a cross-linked composite membrane with a thickness of 60 μm.

Example 2

A 15% mixed perfluorinated sulfonic acid resins, comprising resin A of the structure formula as

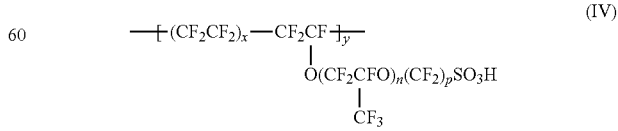

x=5, n=0; p=2; exchange capacity: 1.35 mmol/g, number average molecular weight: 230,000;

and resin B of the structure formula as

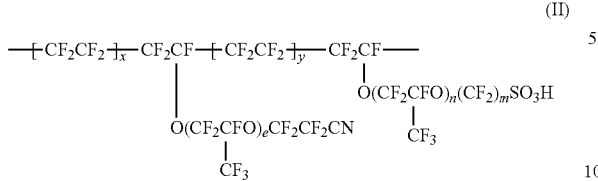

(e=2; n=1; m=3; x=10; y=5, exchange capacity: 0.90 mmol/g; number average molecular weight 250,000) (mass ratio of resin A to resin B is 4:1) was dissolved in a propanol-water solution containing trace triphenyltin, 0.2% manganese(II) nitrate and the polytetrafluoroethylene fiber (diameter: 0.05 μm, length: 5 μm, mass ratio of the modified fiber to the resin is 1:40) modified with

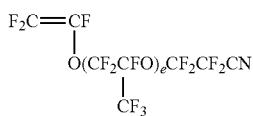

(wherein e=2) by following the modification method as described in Example 1. The solution was prepared to membrane by spraying. The wet membrane sample was then dried at 200° C. for 60 seconds in an oven to obtain a composite membrane with a thickness of 20 μm.

Example 3

A 10 wt % isopropanol-propanol-water solution was prepared by perfluorinated sulfonic acid resin A comprising repeating unit structure

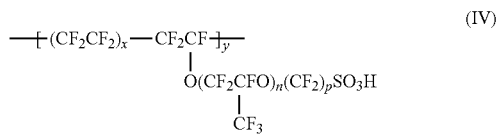

(x=6, n=0; p=4; exchange capacity: 1.25 mmol/g, number average molecular weight: 280,000) and perfluorinated sulfonic acid resin B comprising repeating unit structure

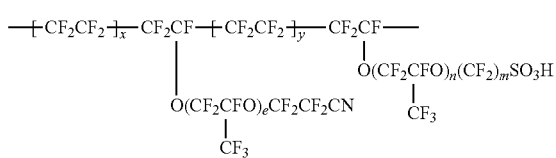

(e=2; n=1; m=3; x=10; y=5, exchange capacity: 0.90 mmol/g; number average molecular weight: 250,000) (mass ratio A:B=5:1). The solution further comprises 5% La (III)-DMF complex, trace triphenyltin and the perfluoropropyl vinylether fiber grafted with

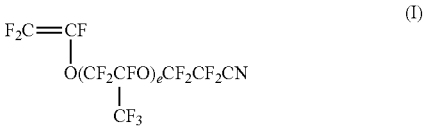

(wherein e=3) by following the modification method as described in Example 1 (diameter: 0.005 μm, length: 0.07 μm, mass ratio of the fiber to the resin is 25:100) (the perfluoropropyl vinylether fiber with a diameter of 0.005 μm may be obtained by electrostatic spinning (US Patent 20090032475). The solution was prepared to membrane by screen-printing, and then was heated at 240° C. for 10 minutes to obtain a membrane with a thickness of 11 μm.

Example 4

The perfluoropropyl vinyl ether fiber (Teflon FPE) grafted with

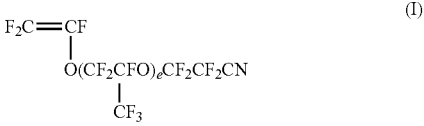

(wherein e = 3) and

(wherein e=1) (mass ratio of the two grafts was 1:1) by following the modification method as described in Example 1 (diameter: 15 μm, length: 2 μm, mass ratio of the fiber to the resin is 0.5:5) was dispersed in a 5% perfluorinated sulfonic acid resin DMF solution which further comprises trace triphenyltin and 0.05% Ce-DMF complex, wherein perfluorinated sulfonic acid resin has a repeating structure formula as

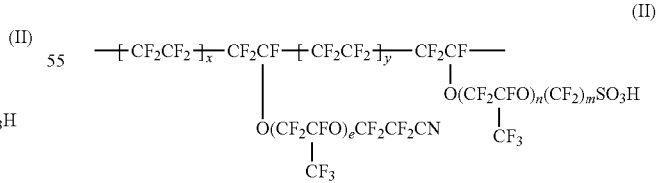

e=3; n=1; m=4; x=7; y=11, exchange capacity: 0.8 mmol/g; number average molecular weight: 310,000. The dispersed solution was prepared to membrane by tape casting. The wet membrane sample was then dried at 100° C. for 20 seconds in an oven, followed by further treated at 190° C. for 20 minutes to obtain a composite membrane with a thickness of 31 μm.

Example 5

The polyvinylidene fluoride fiber (purchased from Shanghai 3F) grafted with both

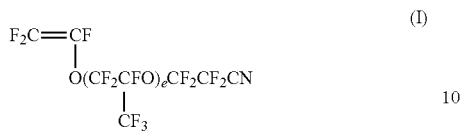

(wherein e = 2) and

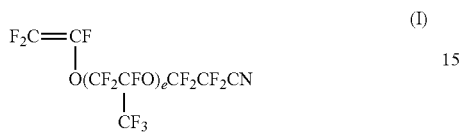

(wherein e=1) (mass ratio of the two grafts was 1:1) by following the modification method as described in Example 1 (diameter: 3 μm, length: 50-70 μm) was dispersed in a DMSO solution containing 30% perfluorinated sulfonic acid resin and 0.01% zinc nitrate which further comprises a small amount of triphenyltin (mass ratio of fiber:perfluorinated sulfonic acid resin=5:100), wherein perfluorinated sulfonic acid resin has a structure formula as

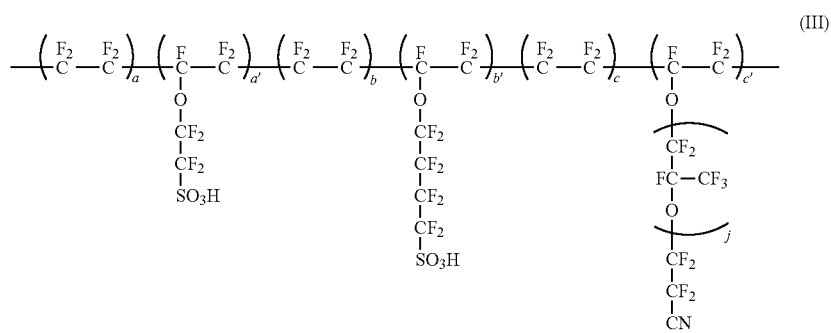

wherein a=9; b=6; c=3; a'=b'=c'=1; j=1, number average molecular weight: 170,000. The dispersed solution was prepared to membrane by spraying. The wet membrane sample was then treated for dried at 250° C. for 20 minutes in an oven to obtain a composite membrane with a thickness of 50 μm.

Example 6

The polyperfluorinated ethylene propylene fiber grafted with both of the two nitrile group-containing monomers (mass ratio is 2:1) which are the same as example 5 (diameter: 30 μm, length: 3 mm, mass ratio of the fiber to the resin is 2:100) was added into a propanol-water solution containing 20% perfluorinated sulfonic acid resin, 2% manganese (II) carbonate and trace triphenyltin, wherein perfluorinated sulfonic acid resin has a structure formula as

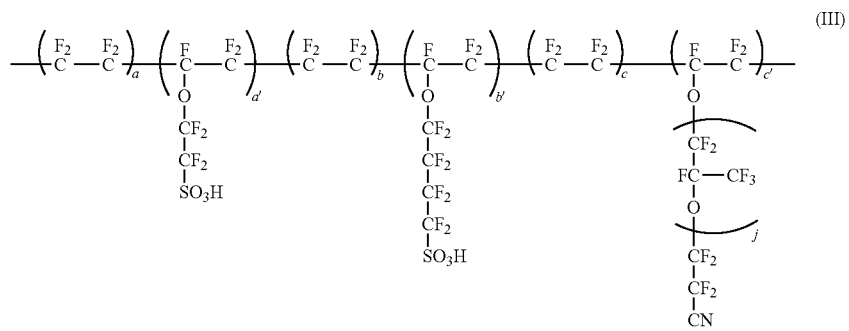
(III)

wherein a=11; b=7; c=5; a'=b'=c'=1; j=1, number average molecular weight is 170,000. The solution was prepared to membrane by spraying. The wet membrane sample obtained was then dried at 180° C. for 20 minutes in an oven to obtain a composite membrane with a thickness of 50 μm.

Example 7

The polytetrafluoroethylene fiber grafted with

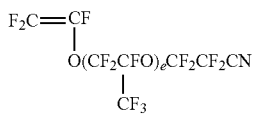
(I)

(wherein e = 3) and

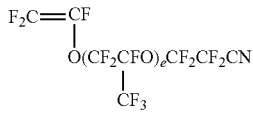
(I)

(wherein e=1) (mass ratio of the two grafts was 1:1) (diameter: 0.5 μm, length: 1 mm) was dispersed and immersed in a NMP solution containing 30% mixed perfluorinated sulfonic acid resins, 5% cyclodextrin-vanadium and trace tetraphenyl antimony, wherein the mixed perfluorinated sulfonic acid resin comprise perfluorinated sulfonic acid resin A with a structure formula as

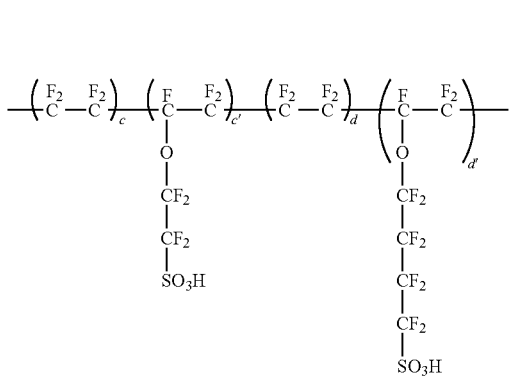
(V)

(c=7; d=5; c'=d'=1; number average molecular weight: 210,000), and perfluorinated sulfonic acid resin B with a structure formula as

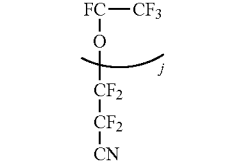
(II)

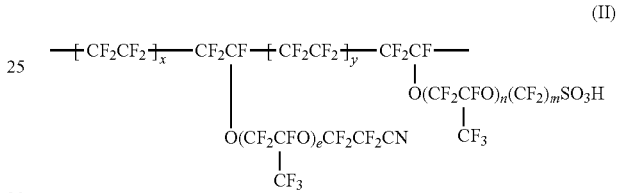

(e=2; n=1; m=3; x=9; y=10, number average molecular weight: 170,000) (mass ratio of A:B=1:2). The dispersed solution was prepared to membrane by tape casting. The wet membrane sample was then dried at 230° C. for 20 minutes in an oven to obtain a composite membrane with a thickness of 25 μm.

Example 8

The polytetrafluoroethylene fiber grafted with

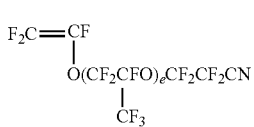
(I)

(wherein e=3) (diameter: 20 μm, length: 3 mm) was dispersed in a methanol-water solution containing 10% mixed perfluorinated sulfonic acid resins, 10% manganese sulfate and trace triphenyltin (mass ratio of the fiber to the resin was 0.5:100), wherein perfluorinated sulfonic acid resin A has a structure formula as

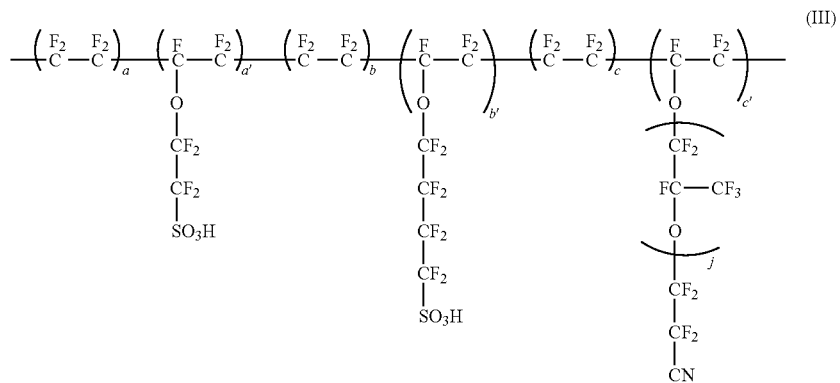

(a=9; b=7; c=5; a'=b'=c'=1; j=1, number average molecular weight: 170,000),
and perfluorinated sulfonic acid resin B has a structure formula as

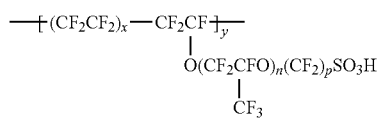

(x=5, n=0; p=4; exchange capacity: 1.20 mmol/g; number average molecular weight: 250,000). The dispersed solution was prepared to membrane by tape casting. The membrane was subjected to heat treatment at 150° C. for 2 minutes to obtain a composite membrane with a thickness of 50 μm.

Example 9

The polyperfluorinated ethylene propylene fiber, 30 μm in diameter and 3 mm in length (e.g. Teflon FEP fiber from DuPont) was charged into a plasma generator to produce plasma by utilizing Ar as working gas under 1 Pa. The obtained plasma was grafted with the following grafting monomer

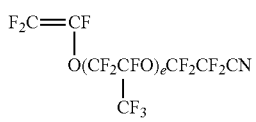

(wherein e=1),
and then mixed in an ethanol-water solution (mass ratio of ethanol to water was 1:1) containing 25% perfluorinated sulfonic acid resin with trace triphenyltin (mass ratio of the fiber to the resin is 0.5:100), wherein the structure formula of perfluorinated sulfonic acid resin is

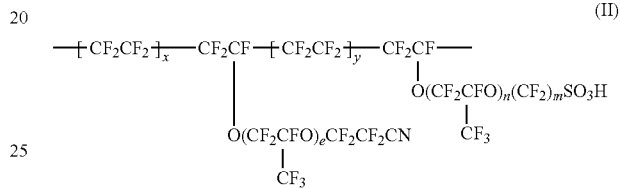

(wherein e=1; n=1; m=2; x=13; y=11, number average molecular weight: 160,000 (synthesis of the resin can be found in CN200910230762.x). The solution was prepared to membrane by tape casting. The obtained wet membrane was treated at 190° C. for 20 minutes to obtain a cross-linked composite membrane with a thickness of 60 μm.

Example 10

A 15% isopropanol-propanol-water solution containing perfluorinated sulfonic acid resin with the structure formula as

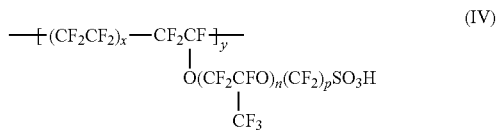

(x=5, n=0; p=4; exchange capacity: 1.2 mmol/g, number average molecular weight: 180,000) and 5% (of the total mass) polytetrafluoroethylene fiber with a diameter of 0.01 μm and a length of 120 μm was prepared to an ordinary composite ion membrane with a thickness of 20 μm by screen-printing.

Example 11

This example was adopted to compare properties of the composite membrane prepared in Examples 1-10.
Properties of all the membranes were characterized and the results were shown in Table 1. It may be concluded from Table 1 that the composite membranes of the present invention are superior to ordinary composite membrane in conductivity at 95° C., tensile strength, hydrogen penetration current, dimensional change rate and other properties. The testing conditions for determining value of conductivity were at T=95° C. and under saturated humidity as well as T=25° C. and after drying for 2 days by a desiccator; the method of testing tensile strength was national standard method (GB/T20042.3-2009); the method of testing hydrogen penetration current was electrochemical method (Electrochemical method and Solid-State Letters, 10, 5, B101-B104, 2007).

TABLE 1

Characteristics of various membranes

| | Nos. | Testing Conditions and Methods | Results |
|---|---|---|---|
| Conductivity (S/cm) | Membrane of Example 9 | T = 95° C., saturated humidity/ T = 25° C., dried for 2 days by a desiccator | 0.0290/0.0116 |
| | Membrane of Example 10 | | 0.0216/0.0041 |
| | Membrane of Example 1 | | 0.0298/0.0118 |
| | Membrane of Example 2 | | 0.0287/0.0134 |
| | Membrane of Example 3 | | 0.0299/0.0123 |
| | Membrane of Example 4 | | 0.0299/0.0128 |
| | Membrane of Example 5 | | 0.0308/0.0129 |
| | Membrane of Example 6 | | 0.0313/0.0123 |
| | Membrane of Example 7 | | 0.0323/0.0121 |
| | Membrane of Example 8 | | 0.0334/0.0133 |
| Tensile Strength (MPa) | Membrane of Example 9 | National standard (GB/T20042.3-2009) | 32 |
| | Membrane of Example 10 | | 30 |
| | Membrane of Example 1 | | 35 |
| | Membrane of Example 2 | | 34 |
| | Membrane of Example 3 | | 36 |
| | Membrane of Example 4 | | 37 |
| | Membrane of Example 5 | | 36 |
| | Membrane of Example 6 | | 38 |
| | Membrane of Example 7 | | 37 |
| | Membrane of Example 8 | | 38 |
| Hydrogen Penetration Current (mA/cm²) | Membrane of Example 9 | Electrochemical method | 2 |
| | Membrane of Example 10 | | >4 |
| | Membrane of Example 1 | | 0.11 |
| | Membrane of Example 2 | | 0.11 |
| | Membrane of Example 3 | | 0.08 |
| | Membrane of Example 4 | | 0.10 |
| | Membrane of Example 5 | | 0.10 |
| | Membrane of Example 6 | | 0.07 |
| | Membrane of Example 7 | | 0.09 |
| | Membrane of Example 8 | | 0.08 |
| Dimensional Change Rate (%) | Membrane of Example 9 | (GB/T20042.3-2009) | 5 |
| | Membrane of Example 10 | | 8 |
| | Membrane of Example 1 | | 1.2 |
| | Membrane of Example 2 | | 1.5 |
| | Membrane of Example 3 | | 1 |
| | Membrane of Example 4 | | 1.3 |
| | Membrane of Example 5 | | 0.9 |
| | Membrane of Example 6 | | 2.1 |
| | Membrane of Example 7 | | 1.1 |
| | Membrane of Example 8 | | 1.1 |

The invention claimed is:

1. A composite material, wherein:

(a) said composite material is composed of one or more ion exchange resins with ion exchange function and fluorine-containing polymer fiber functioning as reinforcing material;

(b) the surface of said fluorine-containing polymer fiber is graft-modified by nitrile group-containing functional monomer;

(c) at least one of ion exchange resins composing said composite material comprises nitrile group which forms triazine ring cross-linked structure with the nitrile group of the functional monomer grafted in fluorine-containing polymer fiber, wherein said nitrile group-containing functional monomer is one or more combinations of substances shown in the following general formula (I):

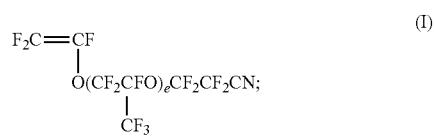

$e \approx 1\text{-}3$ said nitrile-group-containing ion exchange resin is one or more combinations of resins shown in the following general formulas (II) and/or (III):

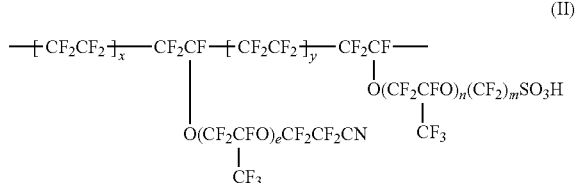

wherein $e \approx 1\text{-}3$; $n=0$ or 1; $m=2\text{-}5$; x, y=an integer of 3-15;

wherein x=3-15, n=0-2; p=2-5;

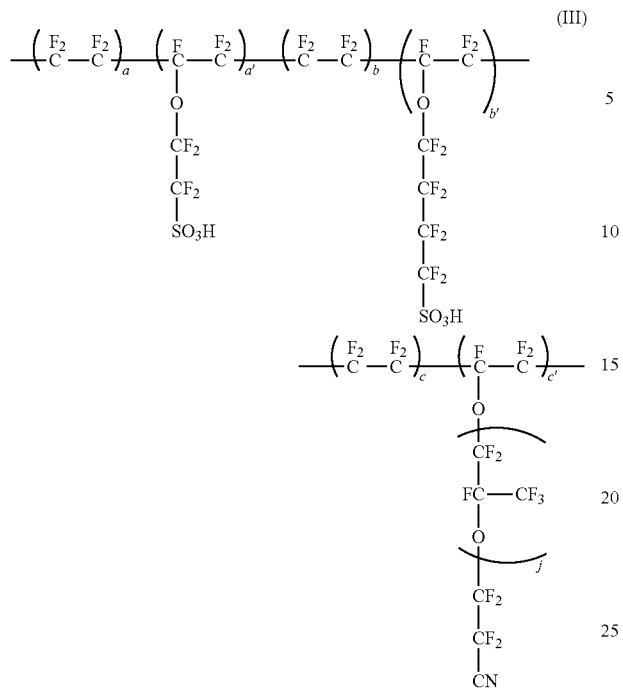

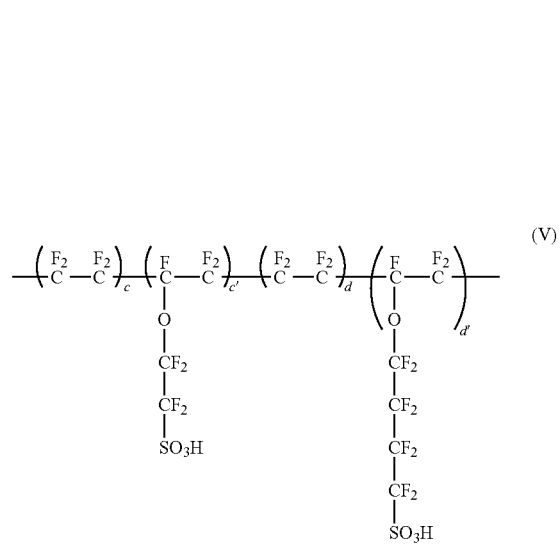

wherein a, b, c=an integer of 3-15; a', b', c'=an integer of 1-3; j=0-3.

wherein c, d=an integer of 3-15; c', d'=an integer of 1-3;

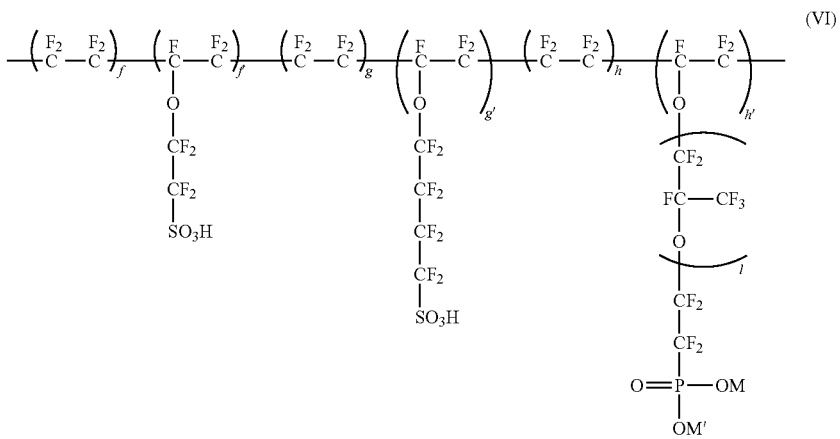

wherein f, g, h=an integer of 3-15; f', g', h'=an integer of 1-3; i=0-3; M, M'=H, K, Na or $NH_4$.

2. The composite material according to claim 1, wherein said composite material further comprises one or more combinations of resins shown in the following general formulas (IV) and/or (V) and/or (VI):

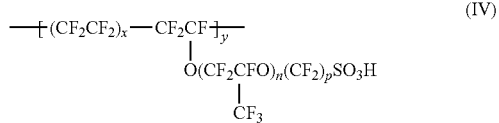

3. The composite material according to claim 2, wherein the ion exchange capacity of said resin as shown in general formulas (II), (III), (IV), (V) or (VI) is 0.80-1.60 mmol/g; the number average molecular weight is 150,000-450,000.

4. The composite material according to claim 3, wherein said fluorine-containing polymer fiber is one or more selected from polytetrafluoroethylene fiber, polyperfluorinated ethylene propylene fiber, perfluoropropyl vinylether fiber and/or fluorocarbon polymer fiber; the diameter of the fluorine-containing polymer fiber is 0.005 μm-50 μm and the length of the fluorine-containing polymer fiber is 0.05 μm-3 mm; the mass ratio of the fluorine-containing polymer fiber to the ion exchange resin is 0.5-50:100.

5. The composite material according to claim 4, wherein the diameter of the fluorine-containing polymer fiber is 0.01 µm-20 µm.

6. The composite material according to claim 4, wherein the mass ratio of the fluorine-containing polymer fiber is 0.5-20:100.

7. The composite material according to claim 4, wherein said composite material comprises a high valence metal compound, through which part of acidic exchange groups in the ion exchange resin form physical bonds in between and part of high valence metal compounds which are also catalysts of forming triazine ring cross-linked structure form complexing bond with the trizaine ring.

8. The composite material according to claim 7, wherein said high valence metal compound forming physical bonds is one or more combinations selected from compounds of the following elements: W, Zr, Ir, Y, Mn, Ru, Ce, V, Zn, Ti and La.

9. The composite material according to claim 8, wherein said high valence metal ion compound is one selected from nitrate, sulfate, carbonate, phosphate, acetate of such metal elements in the highest and intermediate valence state or double salts thereof; or one or more selected from cyclodextrin, crown ether, acetylacetone, nitrogen-containing crown ether or nitrogen-containing heterocycle, EDTA, DMF or DMSO complex of such metal elements in the highest and intermediate valence state; or selected from hydroxide of such metal elements in the highest and intermediate valence state; or selected from oxide, with perovskite structure, of such metal elements in the highest and intermediate valence state, including compounds of $Ce_xTi_{(1-x)}O_2$ (x=0.25-0.4), $Ca0.6_{La0.27}TiO_3$, $La_{(1-y)}Ce_yMnO_3$ (y=0.1-0.4) and $La_{0.7}Ce_{0.15}Ca_{0.15}MnO_3$.

10. The composite material according to claim 7, wherein the added amount of said high valence metal compound is 0.0001-5 wt % of resin.

11. The composite material according to claim 10, wherein the added amount of said high valence metal compound is 0.001-1 wt % of resin.

12. A method for preparing said composite material according to any one of claim 7, wherein the method comprises the following steps: adding strong protonic acid and/or Lewis acid into the composite material as catalyst to allow the nitrile group of at least one of the nitrile group-containing ion exchange resins to form triazine ring cross-linked structure with the nitrile group in a functional monomer grafted in fluorine-containing polymer fiber.

13. The method for preparing said composite material according to claim 12, wherein said protonic acid is selected from $H_2SO_4$, $CF_3SO_3H$, or $H_3PO_4$; said Lewis acid is selected from $ZnCl_2$, $FeCl_3$, $AlCl_3$, organotin, organic antimony, or organic tellurium.

14. The method for preparing said composite material according to claim 12, wherein the added amount of said Lewis acid and/or protonic acid is 0.1%-1% of weight of the ion exchange resins.

15. The method for preparing said composite material according to claim 12, wherein the method comprises the following steps:
(1) mixing a solution of the high valence metal compound and an acid crosslinking catalyst with a dispersed solution of the ion exchange resins as well as nitrile group-grafted fiber, followed by forming wet membrane on a plate after pouring, tape casting, screen-printing process, spraying or impregnating process;
(2) subjecting the wet membrane to heat treatment at 30-300° C. to obtain a composite material with triazine ring cross-linked structure;
the solvent used in the processes of solution pouring, tape casting, screen-printing, spraying impregnating is one or more selected from dimethylformamide, dimethylacetamide, methylformamide, dimethyl sulfoxide, N-methylpyrrolidone, hexamethyl phosphoric acid amide, acetone, water, ethanol, methanol, propanol, isopropanol, glycol and/or glycerol; preparation conditions include: the concentration of the dispersed solution of the ion exchange resins is 1-80%, the temperature for heat treatment is 30-300° C., the time for heat treatment is 1-600 minutes; wherein the amount of the high valence metal compound to be added is 0.0001-5 wt % of weight of the ion exchange resins.

16. The method for preparing said composite material according to claim 15, wherein the concentration of the dispersed solution of the ion exchange resins is 5-40%, the temperature for heat treatment is 120-250° C., the time for heat treatment is 5-200 minutes.

17. The method of preparing said composite material according to claim 15, wherein the amount of the high valence metal compound to be added is 0.001-1 wt % of weight of the ion exchange resins; the acid crosslinking catalyst is Lewis acid and/or protonic acid and the amount to be added is 0.1-1 wt % of weight of the ion exchange resins.

18. An ion exchange membrane made from said composite material according to claim 1.

* * * * *